United States Patent
Yu et al.

(10) Patent No.: US 9,978,704 B2
(45) Date of Patent: *May 22, 2018

(54) SEMICONDUCTOR DEVICES WITH BALL STRENGTH IMPROVEMENT

(71) Applicant: Taiwan Semiconductor Manufacturing Co., Ltd., Hsin-Chu (TW)

(72) Inventors: Tsung-Yuan Yu, Taipei (TW); Hsien-Wei Chen, Hsinchu (TW); Ying-Ju Chen, Tuku Township (TW); Shih-Wei Liang, Dajia Township (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/255,259

(22) Filed: Sep. 2, 2016

(65) Prior Publication Data

US 2016/0372435 A1    Dec. 22, 2016

Related U.S. Application Data

(60) Continuation of application No. 14/515,346, filed on Oct. 15, 2014, now Pat. No. 9,437,567, which is a
(Continued)

(51) Int. Cl.
*H01L 23/00* (2006.01)

(52) U.S. Cl.
CPC .............. *H01L 24/14* (2013.01); *H01L 24/05* (2013.01); *G06F 2217/40* (2013.01);
(Continued)

(58) Field of Classification Search
CPC ......... H01L 24/14; H01L 23/00; H01L 23/48; H01L 23/49; H01L 23/498; H01L 24/05;
(Continued)

(56) References Cited

U.S. PATENT DOCUMENTS 6,165,885 A    12/2000 Gaynes et al.
6,696,757 B2    2/2004 Yunus et al.
(Continued)

FOREIGN PATENT DOCUMENTS

EP    1066962 A2    1/2001
JP    2007012690 A    1/2007
(Continued)

OTHER PUBLICATIONS

Non-Final Office Action dated Feb. 13, 2014 for U.S. Appl. No. 13/291,550.
(Continued)

*Primary Examiner* — Chuong A Luu
(74) *Attorney, Agent, or Firm* — Eschweiler & Potashnik, LLC

(57) ABSTRACT

A semiconductor device includes a contact region over a substrate. The semiconductor device further includes a metal pad over the contact region. Additionally, the semiconductor device includes a post passivation interconnect (PPI) line over the metal pad, where the PPI line is in contact with the metal pad. Furthermore, the semiconductor device includes an under-bump-metallurgy (UBM) layer over the PPI line. Moreover, the semiconductor device includes a plurality of solder balls over the UBM layer, the plurality of solder balls being arranged at some, but not all, intersections of a number of columns and rows of a ball pattern.

20 Claims, 12 Drawing Sheets

Related U.S. Application Data division of application No. 13/291,550, filed on Nov. 8, 2011, now Pat. No. 8,871,629.

(52) U.S. Cl.
CPC .............. *H01L 24/13* (2013.01); *H01L 24/16* (2013.01); *H01L 24/81* (2013.01); *H01L 2224/024* (2013.01); *H01L 2224/0239* (2013.01); *H01L 2224/02311* (2013.01); *H01L 2224/0345* (2013.01); *H01L 2224/0401* (2013.01); *H01L 2224/05569* (2013.01); *H01L 2224/05572* (2013.01); *H01L 2224/05647* (2013.01); *H01L 2224/05666* (2013.01); *H01L 2224/05681* (2013.01); *H01L 2224/131* (2013.01); *H01L 2224/13111* (2013.01); *H01L 2224/1405* (2013.01); *H01L 2224/14133* (2013.01); *H01L 2224/14517* (2013.01); *H01L 2224/16145* (2013.01); *H01L 2224/16225* (2013.01); *H01L 2224/17517* (2013.01); *H01L 2224/81815* (2013.01); *H01L 2924/00014* (2013.01); *H01L 2924/014* (2013.01); *H01L 2924/01029* (2013.01); *H01L 2924/1203* (2013.01); *H01L 2924/1205* (2013.01); *H01L 2924/1206* (2013.01); *H01L 2924/1207* (2013.01); *H01L 2924/1305* (2013.01); *H01L 2924/1306* (2013.01); *H01L 2924/13091* (2013.01); *H01L 2924/1431* (2013.01); *H01L 2924/1434* (2013.01); *H01L 2924/15311* (2013.01); *H01L 2924/3511* (2013.01); *H01L 2924/3512* (2013.01); *H01L 2924/37001* (2013.01)

(58) Field of Classification Search
CPC ......... H01L 24/13; H01L 24/16; H01L 24/81; H01L 2224/024; H01L 2224/02311; H01L 2224/131; H01L 2224/13111
USPC ......................................................... 257/738
See application file for complete search history.

(56) References Cited

U.S. PATENT DOCUMENTS

| | | | |
|---|---|---|---|
| 7,329,598 B2 | 2/2008 | Shizuno | |
| 9,437,567 B2* | 9/2016 | Yu | ............................ H01L 24/05 |
| 2002/0142574 A1 | 10/2002 | Chen et al. | |
| 2004/0164427 A1 | 8/2004 | Seaman et al. | |
| 2007/0085182 A1 | 4/2007 | Yamaguchi | |
| 2007/0152350 A1* | 7/2007 | Kim | .................... H01L 23/3128 |
| | | | 257/786 |
| 2007/0215985 A1 | 9/2007 | Chen | |
| 2011/0092022 A1 | 4/2011 | Yamaguchi | |
| 2013/0043583 A1* | 2/2013 | Wu | .................... H01L 23/3171 |
| | | | 257/737 |
| 2013/0256876 A1 | 10/2013 | Lee et al. | |

FOREIGN PATENT DOCUMENTS

| | | |
|---|---|---|
| KR | 20040080815 A | 9/2004 |
| WO | 2009079497 A1 | 6/2009 |

OTHER PUBLICATIONS

Notice of Allowance dated Jun. 26, 2014 for U.S. Appl. No. 13/291,550.
Non-Final Office Action dated Jul. 22, 2015 for U.S. Appl. No. 14/515,346.
Final Office Action dated Jan. 14, 2016 for U.S. Appl. No. 14/515,346.
Notice of Allowance dated May 11, 2016 for U.S. Appl. No. 14/515,346.

\* cited by examiner

SEMICONDUCTOR DEVICES WITH BALL STRENGTH IMPROVEMENT

REFERENCE TO RELATED APPLICATION

This Application is a Continuation of U.S. application Ser. No. 14/515,346 filed on Oct. 15, 2014 now U.S. Pat. No. 9,437,567, which is a Divisional of U.S. application Ser. No. 13/291,550 filed on Nov. 8, 2011 (now U.S. Pat. No. 8,871,629 issued on Oct. 28, 2014). The contents of both Applications are hereby incorporated by reference in their entireties.

TECHNICAL FIELD

The present disclosure relates to semiconductor devices with ball strength improvement.

BACKGROUND

The recent trend in miniaturizing integrated circuits (IC or chip) has lead to various types of IC packages, such as chip scale packages (CSP).

For example, in a wire-bonded CSP, a chip is electrically connected to an underlying substrate by bonding wires. Such a configuration requires a size increase both in height to accommodate wire loops and in width and/or length to accommodate wire bonding pads. To further reduce the package size, flip-chip CSPs have been proposed.

In a flip-chip CSP, a chip is electrically connected to an underlying substrate not by wires but by solder bumps.

In such a flip-chip CSP, if there is a mismatch in the coefficients of thermal expansion (CTE) between the chip and the substrate, for example, if the CTE of the substrate is greater than that of the chip, the substrate contracts at a greater rate than the chip when the temperature is reduced, e.g., after a solder-reflowing process. As a result, warpage occurs to the CSP which, in turn, causes product reliability and/or production yield issues.

To prevent warpage, it has been proposed to add an underfill material between the chip and the substrate to "lock" the chip to the substrate.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

Figure 1:
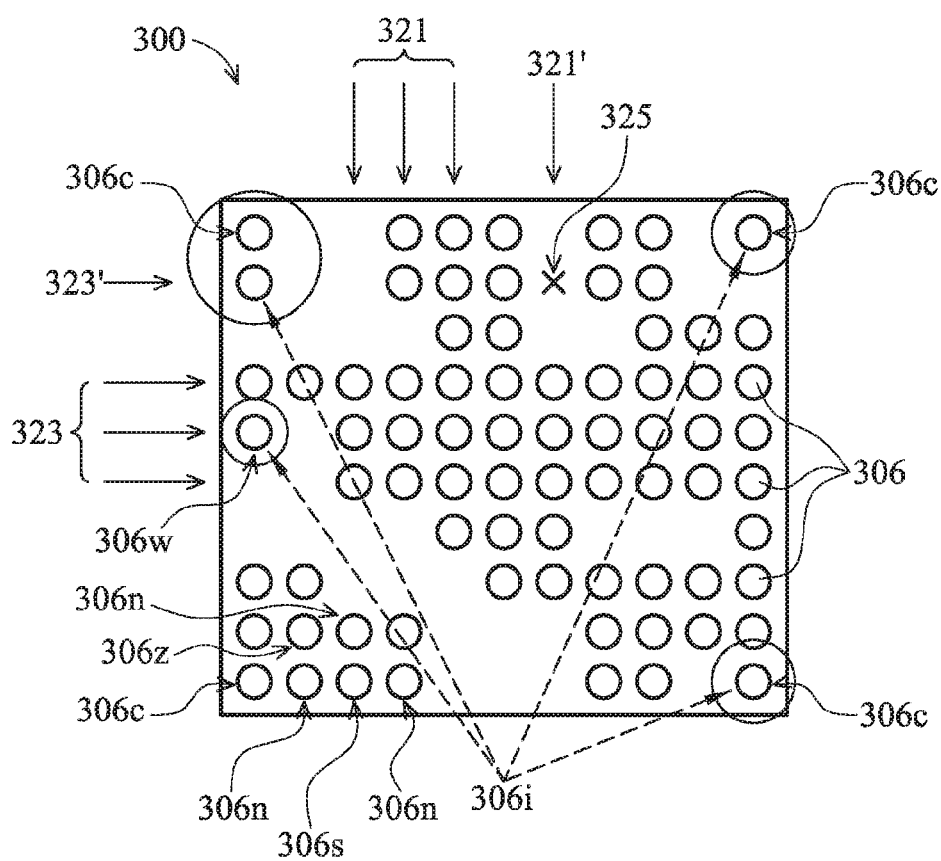
FIG. 1 is a schematic plan view of a ball pattern.

It is to be understood that the following disclosure provides many different embodiments or examples, for implementing different features of various embodiments. Specific examples of components and arrangements are described below to simplify the present disclosure. The inventive concept may, however, be embodied in many different forms and should not be construed as being limited to the embodiments set forth herein; rather, these embodiments are provided so that this description will be thorough and complete, and will fully convey the inventive concept to those of ordinary skill in the art. It will be apparent, however, that one or more embodiments may be practiced without these specific details.

In the drawings, the thickness and width of layers and regions are exaggerated for clarity. Like reference numerals in the drawings denote like elements. The elements and regions illustrated in the figures are schematic in nature, and thus relative sizes or intervals illustrated in the figures are not intended to limit the scope of the inventive concept.

The inventors have recognized that an arrangement of solder bumps or solder balls for electrical connectivity of a chip or a chip package to a substrate or another component is often configured with primary considerations given to the chip's operation, rather than mechanical strength. In some cases, the solder bumps or solder balls are not uniformly distributed across the surface of the chip or chip package. Some uneven distributions of solder bumps or solder balls generate a higher stress at some solder bumps or solder balls than at other solder bumps or balls. As a result, issues such as ball/bump crack or die chipping are likely to occur.

In some embodiments, a ball pattern of balls to be formed for a chip or chip package is modified so that at least a region of the ball pattern includes no isolated ball, as used herein, for improved ball strength. In some embodiments, such modification includes moving and/or adding one or more balls so that an isolated ball has at least two neighboring balls and is no longer considered isolated. In some embodiments, the isolated ball, for which the modification is performed, is a corner ball of the ball pattern.

As used herein, a "semiconductor device" is a chip or a chip package containing therein at least one chip.

Figure 13:
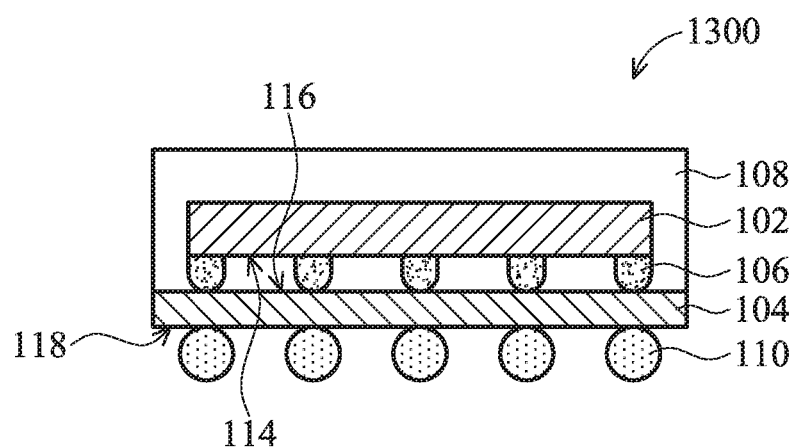
FIG. 13 is a schematic cross-section view of a chip scale package (CSP) in accordance with some embodiments.

An example of a semiconductor device is a bare chip or die (as exemplarily shown at 102 in FIG. 13). Another example of a semiconductor device is a chip package (as exemplarily shown at 1300 in FIG. 13) which includes, in addition to at least one chip (such as 102 in FIG. 13), a carrier or substrate (such as 104 in FIG. 13) on which the at least one chip is mounted. Yet another example of a semiconductor device is a stack of chips one on top another. A further example of a semiconductor device is a multi-chip package that includes more than one chip. In some embodiments, a chip package further includes an encapsulant (as exemplarily shown at 108 in FIG. 13) embedding therein the chip or chips.

As used herein, a "connection ball" is a conductive bump or ball deposited on a surface of a semiconductor device for electrically connecting the chip(s) of the semiconductor device to at least one external component or device. The connection ball also functions to physically connect the semiconductor device to the external component or device. However, the primary function of the connection ball is to transmit electrical signals, e.g., power, ground, or data, to/from the semiconductor device.

An example of a connection ball is a solder bump (as exemplarily shown at 106 in FIG. 13) on a surface of a chip (as exemplarily shown at 102 in FIG. 13) for electrically connecting the chip to at least one external component or device (e.g., a substrate or carrier as exemplarily shown at 104 in FIG. 13). Another example of a connection ball is a solder ball (as exemplarily shown at 110 in FIG. 13) on a surface of a chip package (as exemplarily shown at 1300 in FIG. 13) for electrically connecting the chip in the chip package to at least one external component or device (not shown).

As used herein, a "dummy ball" is a bump or ball deposited on the same surface of a semiconductor device on which connection balls of the semiconductor device are provided for electrically connecting the chip(s) of the semiconductor device to at least one external component or device; however, the dummy ball is primarily for physically connecting the semiconductor device to the at least one external component or device.

In some embodiments, the dummy ball provides no electrical connection between the semiconductor device and the external component or device. In an example, the dummy ball is not in electrical connection with the semiconductor device. In a further example, the dummy ball is in electrical connection with the semiconductor device, but not in electrical connection with the external component or device.

In some embodiments, the dummy ball provides an electrical connection between the semiconductor device and the external component or device. However, such electrical connection does not affect the intended operation or functionality of the semiconductor device. For example, the dummy ball provides an electrical connection for a ground or power supply voltage between the semiconductor device and the external component or device, in addition to one or more other ground or power connections already provided by one or more connection balls of the semiconductor device.

As used herein, "connection ball" and "dummy ball" are commonly referred to as "ball" unless otherwise specified.

FIG. 1 is a schematic plan view of a ball pattern 300 of a semiconductor device (not shown). The ball pattern 300 includes a plurality of connection balls 306 for the semiconductor device. The ball pattern 300 includes a plurality of columns 321 (exemplarily identified by vertical arrows in FIG. 1) and rows 323 (exemplarily identified by horizontal arrows in FIG. 1) which cross or intersect each other at a plurality of intersections 325. For the sake of simplicity, only one intersection 325 is indicated in FIG. 1 at the intersection of a column 321' and a row 323'. In some embodiments, the columns and rows are perpendicular to each other as exemplarily illustrated in FIG. 1. In some embodiments, the columns and rows are not perpendicular, e.g., they intersect at an angle greater than 90 degrees or less than 90 degrees.

The connection balls 306 are each arranged at one of the intersections 325. As noted above, the physical arrangement of the connection balls 306 is configured with primary consideration given to the semiconductor device's operation, rather than mechanical strength. As such, the connection balls 306 are often unevenly distributed as exemplarily illustrated in FIG. 1. Such an uneven distribution of balls generates a higher stress at some balls than at other balls. As a result, issues such as ball crack or die chipping (during backside grinding) are likely to occur.

The inventors have found that isolated balls are likely causes of defects, such as ball crack or die chipping, especially when such isolated balls are corner balls, i.e., balls that are located at the corners of the ball pattern, as exemplarily illustrated at 306c in FIG. 1.

As used herein, an "isolated ball" is a ball that has no or only one neighboring ball.

As used herein, a "neighboring ball" of a specific ball is a ball immediately adjacent the specific ball in the same column or row as the specific ball.

For example, as exemplarily illustrated in FIG. 1, a specific ball 306s has three neighboring balls 306n each of which is immediately adjacent to and on the same column or row as the specific ball 306s. A ball 306z, which is adjacent the specific ball 306s but is not on the same column or row as the specific ball 306s, is not a neighboring ball, i.e., diagonally-adjacent balls are not considered neighboring balls.

Several isolated balls 306i are identified (by small circles) in the ball pattern 300. As exemplarily illustrated in FIG. 1, each of the isolated balls 306i has at most one neighboring ball. Some of the corner balls 306c are also isolated balls which are especially likely to suffer from defects, such as ball crack or void, etc.

FIGS. 2A-2C and 3-4 are schematic plan views of possible corner regions 400A-400E, respectively, of a ball pattern, such as the ball pattern 300. As exemplarily illustrated in FIGS. 2A-2C and 3-4, a corner region is a region that includes a corner of the ball pattern. A corner ball is not necessarily arranged at a corner of the ball pattern for a region containing the corner to be considered a corner region. For example, as exemplarily illustrated in FIG. 3, the corner 325c of the ball pattern is empty, yet the region 400D containing the empty corner 325c is still considered a corner region.

The corner balls 306c of the corner regions 400A and 400B are isolated balls each having only one neighboring ball 306n. The corner ball 306c of the corner region 400C is also an isolated ball having no neighboring ball. The corner region 400D has no corner ball. Further, each and every ball in the corner region 400D has at least two neighboring balls. The corner region 400E has the corner ball 306c which is not an isolated ball. Further, each and every ball in the corner region 400E has at least two neighboring balls.

The inventors have found that the mean fatigue life of a semiconductor device including a ball pattern having a corner region with an isolated ball (such as the corner regions 400A-400C) is about 15% to 20% lower than the mean fatigue life of a semiconductor device including a ball pattern having corner regions with no isolated balls (such as the corner regions 400D-400E). In other words, a corner region with no isolated balls (such as the corner regions 400D-400E) provides improved ball strength over a corner region with an isolated ball (such as the corner regions 400A-400C). This is also true for any other region (not necessarily a corner region) and/or for any ball (not necessarily a corner ball) in the ball pattern. For example, the ball strength of a (non-corner) region including an isolated ball 306w (which is not a corner ball) in FIG. 1 would be improved if the region included no isolated balls.

Figure 5:
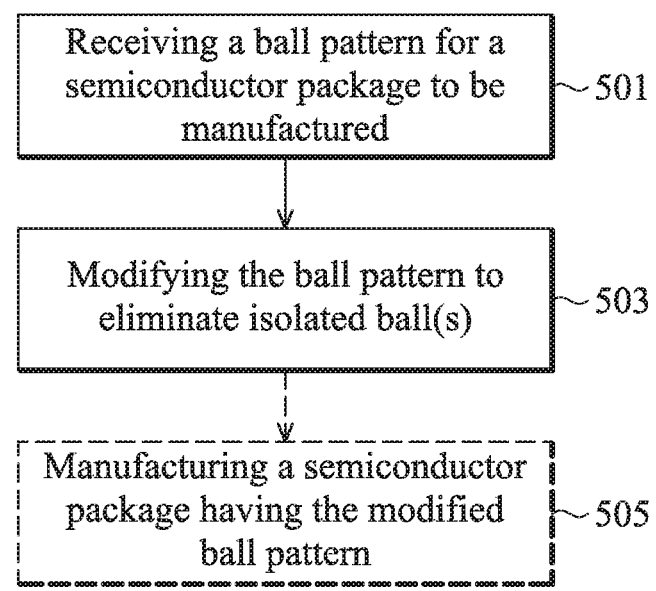
FIG. 5 is a flow chart of a method in accordance with some embodiments.

Accordingly, in accordance with some embodiments, an arrangement of balls in a region of a ball pattern is modified so that the region includes no isolated balls. FIG. 5 is a flow chart of a method 500 in accordance with such embodiments.

At step 501, a ball pattern of a plurality of connection balls to be formed as electrical connections for a semiconductor device is received. The received ball pattern includes a region with an isolated ball (e.g., the corner region 400A).

As step 503, an arrangement of balls in the region 400A is modified so that the region no longer includes isolated balls. For example, the region 400A, 400B or 400C is modified in some embodiments to become the region 400D or 400E with no isolated balls.

At step 505, the semiconductor device is manufactured with the modified ball pattern. Any manufacturing process suitable for fabrication of semiconductor devices is applicable. An exemplary process will be described later with respect to FIGS. 7A-7B.

In some embodiments, the region to be modified at step 503 is a corner region of the ball pattern. In further embodiments, the region to be modified at step 503 includes some or all corner regions of the ball pattern. In yet further embodiments, the region to be modified at step 503 is the entire ball pattern.

In step 503, one potential modification includes moving the isolated ball to an empty intersection, so that every ball in the region being modified has at least two neighboring balls.

Figure 2A:
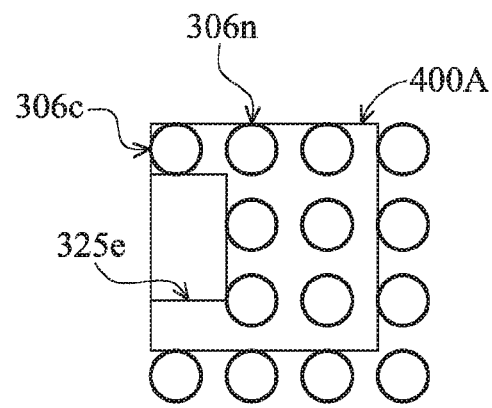
FIGS. 2A-2C, 3 and 4 are schematic plan views of some regions of a ball pattern.

For example, the isolated ball (e.g., the corner ball 306c) in region 400A which is also a connection ball is moved to an empty intersection (e.g., 325e in FIG. 2A). The region 400A will then become the region 400D in which every ball has at least two neighboring balls. The moved ball (e.g., 306m in FIG. 3) remains a connection ball to ensure proper or intended operation or functionality of the semiconductor device. Rerouting of one or more conductive layers of the semiconductor device is performed in some embodiments to provide a proper electrical connection to/from the moved ball 306m.

Figure 2B:
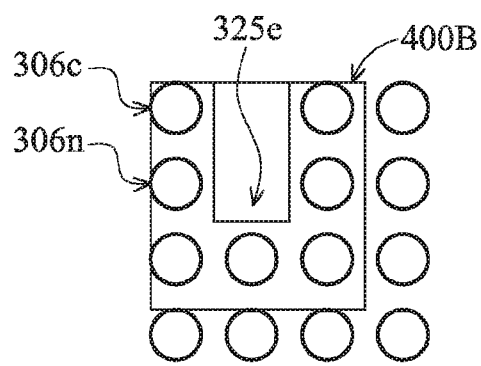
Figure 2C:
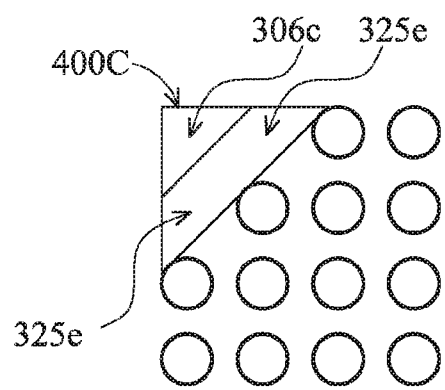
Figure 3:
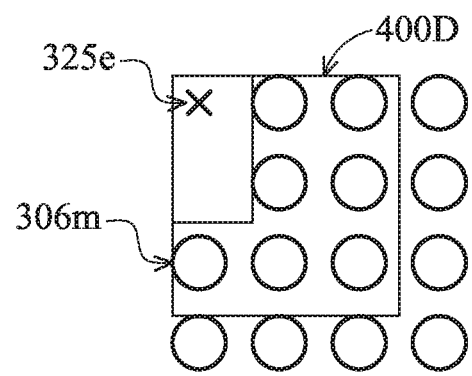
Figure 4:
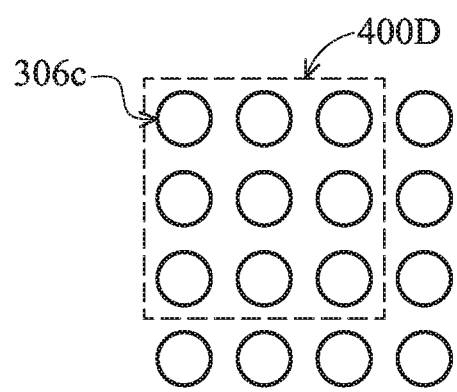

Similarly, if the region with an isolated ball is the region 400B, it is modified in some embodiments to become the region 400D by moving the isolated ball (e.g., the corner ball 306c in region 400B) to an empty intersection (e.g., 325e in FIG. 2B). Likewise, if the region with an isolated ball is the region 400C, it is modified in some embodiments to become the region 400D by moving the isolated ball (e.g., the corner ball 306c in region 400C) to an empty intersection (e.g., either of the two empty intersections 325e in FIG. 2C).

In some embodiments, the isolated ball is moved completely out of the region being modified. For example, the isolated ball (e.g., the corner ball 306c) in region 400C is completely moved out of the region 400C, making the modified region free of isolated balls.

In step 503, another potential modification includes adding a dummy ball to an empty intersection so that every ball in the region being modified has at least two neighboring balls. In some embodiments, the adding of dummy ball is performed in place of or in addition to the moving of connection ball as described above.

In some embodiments, dummy balls are added to all empty intersections in the region to be modified (e.g., any of the regions 400A-400C). In other words, the modification includes populating every empty intersection in the region being modified with a dummy ball. As a result, the region 400E is obtained in which every ball has at least two neighboring balls.

However, dummy balls are not necessarily added to all empty intersections in the region to be modified, provided that every ball in the modified region has at least two neighboring balls, as exemplarily disclosed herein below.

Figure 6A:
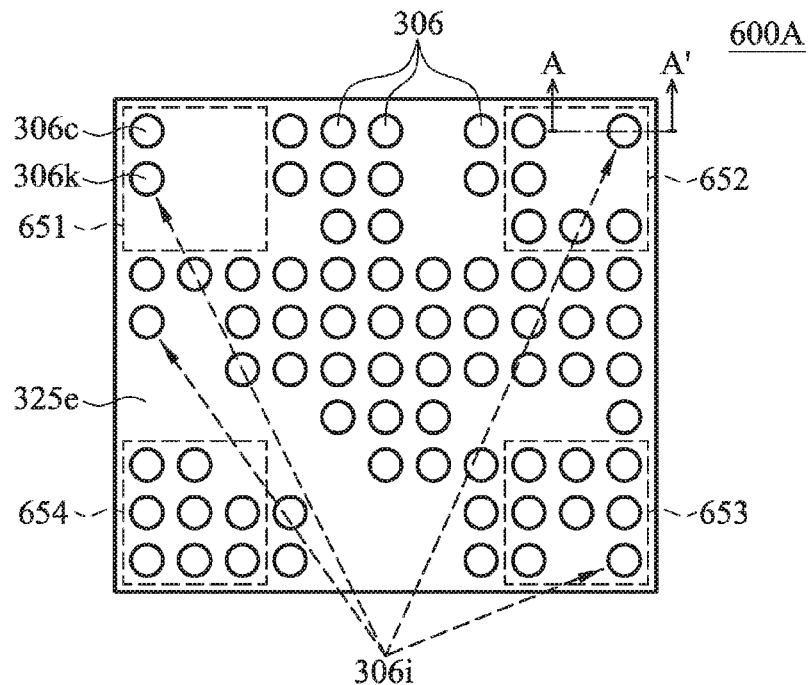
FIGS. 6A and 6B are schematic plan views of a ball pattern and a modified ball pattern in accordance with some embodiments, respectively.
Figure 6B:
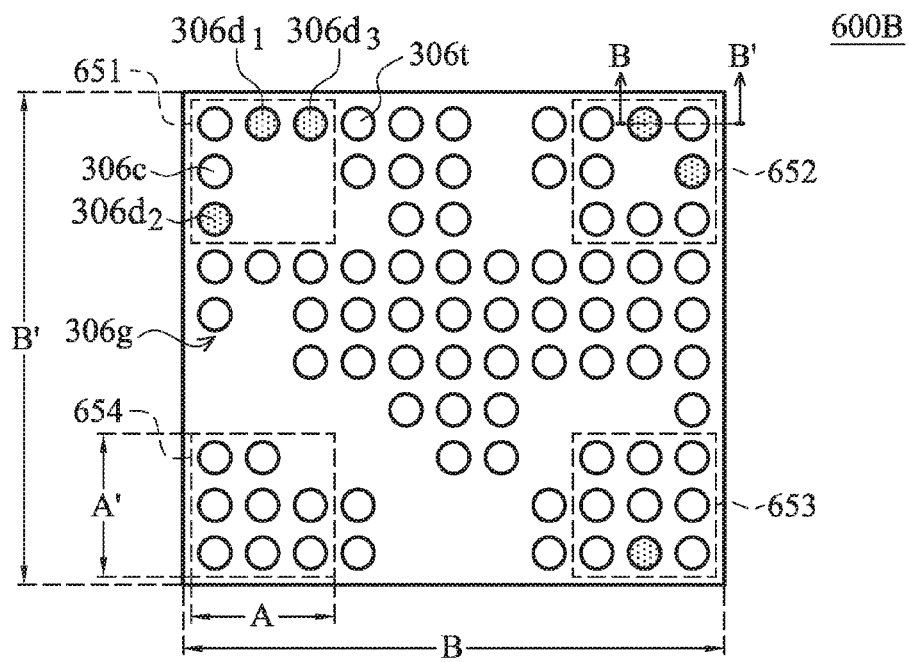
Figure 8:
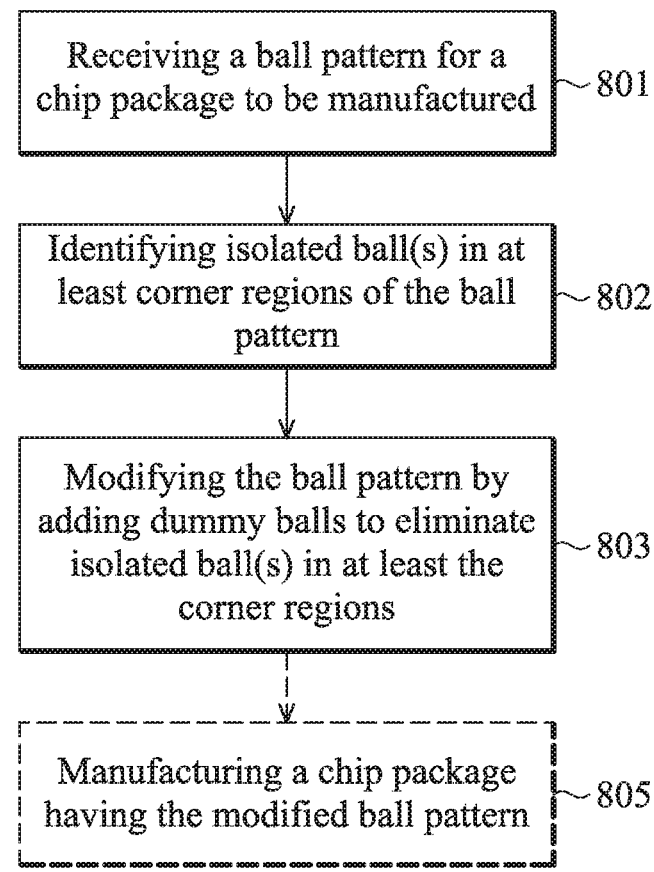
FIG. 8 is a flow chart of a method in accordance with some embodiments.

FIGS. 6A and 6B are schematic plan views of a ball pattern 600A and a modified ball pattern 600B in accordance with some embodiments, respectively. FIG. 8 is a flow chart of a method 800 in accordance with some embodiments. The ball patterns of FIGS. 6A-6B will be used for illustration purposes with respect to the description of FIG. 8.

At step 801, a ball pattern (such as the ball pattern 600A in FIG. 6A) of a plurality of connection balls 306 to be formed as electrical connections for a semiconductor device is received. The connection balls 306 are arranged at some, but not all, intersections of the columns and rows (not numbered) of the ball pattern 600A. Thus, some intersections remain empty as exemplarily illustrated at 325e in FIG. 6A.

As step 802, at least one of the corner regions 651-654 (FIG. 6A) is analyzed to identify any isolated ball existing in the corner region. As discussed before, an isolated ball is a ball that has at most one neighboring ball. For example, in the exemplary ball pattern 600A in FIG. 6A, when the corner region 651 is analyzed, two isolated balls 306i are identified one of which is a corner ball 306c.

In some embodiments, the analysis is performed manually, e.g., by visually examining the layout of the received ball pattern 600A. In some embodiments, the analysis is performed by a computer system hardwired or programmed to identify isolated balls. For example, the computer system, e.g., a general purpose computer system, is configured to count, for each ball, the number of neighboring balls immediately adjacent to and on the same column or row as the ball in question. If the counted number of neighboring balls is one or zero, the ball in question is flagged as an isolated ball.

As step 803, the at least one corner region, e.g., 651, is modified by adding one or more dummy balls each to an empty intersection adjacent the identified isolated ball, e.g., the corner ball 306c in the corner region 651, so that the ball has two or more neighboring balls and is no longer considered isolated. Similar to step 802, the dummy ball addition is performed either manually or by way of a computer system.

For example, at least one dummy ball 306d1 is added to an empty intersection adjacent the corner balls 306c (which is identified at step 802 as an isolated ball) in the corner region 651, as exemplarily illustrated in FIG. 6B. Thus, the corner ball 306c in the corner region 651 in the modified ball pattern 600B is no longer considered isolated, as it now has two neighboring balls, one neighboring ball being the added dummy ball 306d1, the other neighboring ball being the connection ball 306k immediately below the corner ball 306c in the same column. Step 803 in accordance with some embodiments which are arranged to improve corner ball strength in the analyzed corner region is terminated here.

In some embodiments, step 803 is performed not only to improve corner ball strength, but also to improve ball strength at other connection balls in the analyzed corner region. For example, the corner region 651 also includes another connection ball 306k which has also been identified as an isolated ball. Thus, at least another dummy ball 306d2 is added to an empty intersection adjacent the isolated ball 306k, as exemplarily illustrated in FIG. 6B. Thus, the ball 306k in the modified ball pattern 600B is no longer considered isolated, as it now has two neighboring balls, one neighboring ball being the added dummy ball 306d2, the other neighboring ball being the corner ball 306c immediately above the ball 306k in the same column. Step 803 in accordance with some embodiments which are arranged to improve connection ball strength in the analyzed corner region is terminated here.

In some embodiments, step 803 is performed not only to improve connection ball strength, but also to improve dummy ball strength in the analyzed corner region. For example, as seen in FIG. 6B, when the dummy ball 306d1 is added, it is an isolated ball having only one neighboring ball being the corner ball 306c. If the semiconductor device is manufactured with such an isolated dummy ball, the isolated dummy ball is subject to increased stress and is prone to defects such as ball crack. Since the isolated dummy ball is not required to provide intended operation or functionality for the semiconductor device, a crack, if such occurs, is unlikely to affect the semiconductor device's operation or functionality. Therefore, in some situations, isolated dummy balls are acceptable in the modified ball pattern.

However, in situations where a crack even in an isolated dummy ball and/or die chipping related to isolated dummy balls is/are not desirable, one or more further dummy balls are added to ensure that, in the analyzed corner region, no isolated balls (including both connection and dummy balls) exist. For example, in the modified ball pattern 600B of FIG. 6, a further dummy ball 306d3 is added to an empty intersection adjacent the isolated dummy ball 306d1, so that the dummy ball 306d1 has at least two neighboring balls and is no longer considered to be an isolated ball.

The newly added dummy ball 306d3 is analyzed in some embodiments to determine whether the newly added dummy ball is an isolated ball. If the answer is positive, another dummy ball is added to an empty intersection adjacent the isolated dummy ball 306d3, so that the dummy ball 306d3 has at least two neighboring balls and is no longer considered an isolated ball. The process repeated until every ball (no matter whether it is a connection ball or a dummy ball) in the analyzed corner region has two or more neighboring balls. The neighboring balls need not be located in the analyzed corner region. For example, the dummy ball 306d3 in FIG. 6B has a neighboring ball 306t which is outside the analyzed corner region 651. Step 803 in accordance with some embodiments which are arranged to improve both connection and dummy ball strength in the analyzed corner region is terminated here.

At step 805, the semiconductor device is manufactured with the modified ball pattern. Any manufacturing process suitable for fabrication of semiconductor devices is applicable. An exemplary process will now be exemplarily described with respect to FIGS. 7A-7B which are cross-section views taken along line A-A' in FIG. 6A and line B-B' in FIG. 6B, respectively.

Figure 7A:
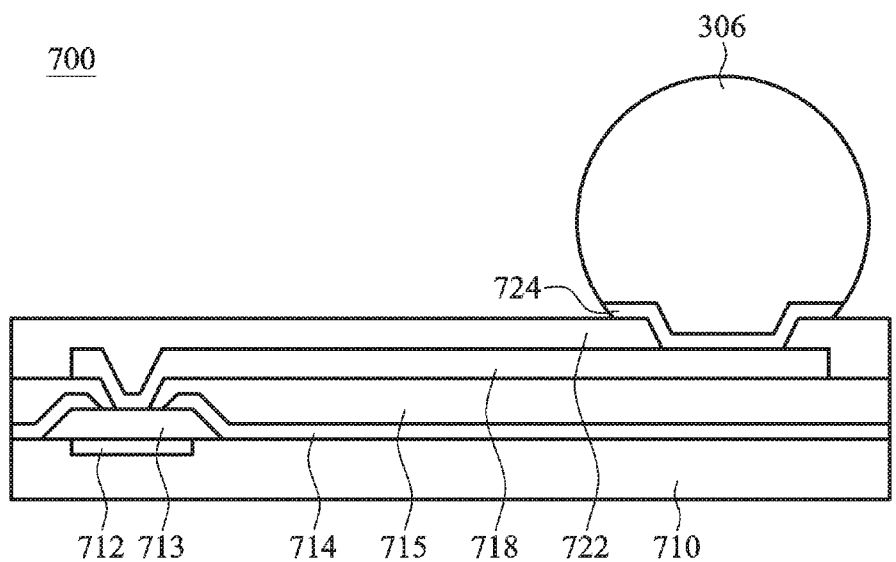
FIGS. 7A and 7B are cross-section views taken along line A-A' in FIG. 6A and line B-B' in FIG. 6B, respectively.
Figure 7B:
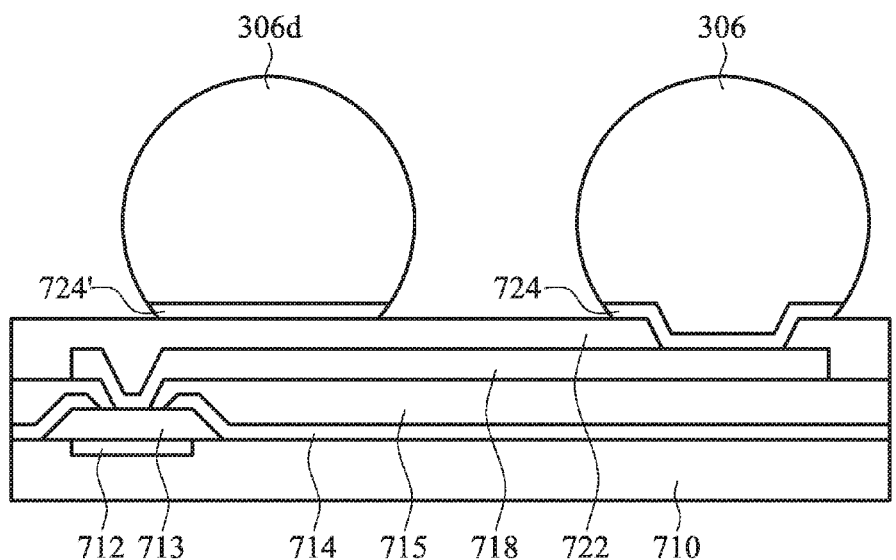

As can be seen in FIG. 7A, a semiconductor device 700 includes a substrate 710 which is a semiconductor substrate with integrated circuits formed therein and/or thereon. The substrate 710 includes, but is not limited to, bulk silicon, a semiconductor wafer, a silicon-on-insulator (SOI) substrate, or a silicon germanium substrate. Other semiconductor materials including group III, group IV, and group V elements are used in some embodiments. The substrate 710, in some embodiments, further comprises a plurality of isolation features (not shown), such as shallow trench isolation (STI) features or local oxidation of silicon (LOCOS) features. The isolation features define and isolate various microelectronic elements (not shown). Examples of such various microelectronic elements formed in the substrate 710 in accordance with some embodiments include transistors (e.g., metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), etc.); resistors; diodes; capacitors; inductors; fuses; and other suitable elements. Various processes are performed to form the various microelectronic elements including deposition, etching, implantation, photolithography, annealing, and other suitable processes. The microelectronic elements are interconnected to form the integrated circuit device, such as a logic device, memory device (e.g., SRAM), RF device, input/output (I/O) device, system-on-chip (SoC) device, combinations thereof, and other suitable types of devices.

The substrate 710 further includes, in some embodiments, inter-layer dielectric layers and a metallization structure overlying the integrated circuits. The inter-layer dielectric layers in the metallization structure include low-k dielectric materials, un-doped silicate glass (USG), silicon nitride, silicon oxynitride, or other commonly used materials. The dielectric constants (k value) of the low-k dielectric materials is, in some embodiments, less than about 3.9, or less than about 2.8. Metal lines in the metallization structure are, in some embodiments, formed of copper or copper alloys. One skilled in the art will realize the formation details of the metallization layers.

A contact region 712 is a top metallization layer formed in a top-level inter-layer dielectric layer, which is a portion of conductive routes and has an exposed surface treated by a planarization process, such as chemical mechanical polishing (CMP), if necessary. Suitable materials for the contact region 712 include, but are not limited to, for example, copper (Cu), aluminum (Al), AlCu, copper alloy, or other conductive materials. In one embodiment, the contact region 712 includes a metal pad 713 (e.g., Al), which is, in some embodiments, used in the bonding process to connect the integrated circuits in the respective chip to external features.

A passivation layer 714 is formed on the substrate 710 and patterned to form an opening 715 exposing a portion of the metal pad 713 for allowing subsequent post passivation interconnect processes. In one embodiment, the passivation layer 714 is formed of a non-organic material selected from un-doped silicate glass (USG), silicon nitride, silicon oxynitride, silicon oxide, and combinations thereof. In another embodiment, the passivation layer 714 is formed of a polymer layer, such as an epoxy, polyimide, benzocyclobutene (BCB), polybenzoxazole (PBO), and the like, although other relatively soft, often organic, dielectric materials are also usable.

A post passivation interconnect (PPI) process is then performed on the passivation layer 714. In some embodiments, an adhesion layer (not shown) and a seed layer (not shown) are formed on the passivation layer 714 to line the sidewalls and bottom of the opening 715. The adhesion layer, also referred to as a glue layer, is blanket formed, covering the passivation layer 714 and the sidewalls and the bottom of the opening 715. The adhesion layer includes commonly used barrier materials such as titanium, titanium nitride, tantalum, tantalum nitride, and combinations thereof, and is formed using physical vapor deposition, sputtering, or the like. The adhesion layer helps to improve the adhesion of the subsequently formed conductive lines onto passivation layer 714. The seed layer is blanket formed on the adhesion layer. The materials of the seed layer include aluminum, aluminum, alloys copper, copper alloys, silver, gold, aluminum, and combinations thereof. In an embodiment, the seed layer is formed of sputtering. In other embodiments, other commonly used methods such as physical vapor deposition or electroless plating are used.

A post passivation interconnect (PPI) line 718 is formed on the adhesion layer and seed layer (if used) to fill the opening 715. Using a mask and a photolithography process, a conductive material fills the opening 715 of the passivation layer 714 and an opening of the mask, followed by removing the mask and any exposed portions of the adhesion layer and seed layer. The removal includes a wet etching process or a dry etching process. In one embodiment, the removal includes an isotropic wet etching using an ammonia-based acid, which is, in some embodiments, a flash etching with a short duration.

The conductive material filling the opening 715 serves as the PPI line 718. The PPI line 718 includes, but is not limited to, for example, copper, aluminum, copper alloy, or other conductive materials. The PPI line 718 further includes, in some embodiments, a nickel-containing layer (not shown) on the top of a copper-containing layer. The PPI formation methods include plating, electroless plating, sputtering, chemical vapor deposition methods, and the like. The PPI line 718 connects the contact region 712 to bump features. The PPI line 718 also functions, in some embodiments, as power lines, re-distribution lines (RDL), inductors, capacitors or any passive components. The PPI line 718 in some embodiments has a thickness less than about 30 µm, for example, between about 2 µm and about 25 µm.

A dielectric layer (not shown), also referred to as an isolation layer or a passivation layer, is formed in some embodiments on the exposed passivation layer 714 and the PPI line 718. The dielectric layer is formed of dielectric materials such as silicon nitride, silicon carbide, silicon oxynitride or other applicable materials. The formation methods include plasma enhance chemical vapor deposition (PECVD) or other commonly used CVD methods.

A polymer layer 722 is formed on the dielectric layer. Lithography technology and etching processes such as a dry etch and/or a wet etch process, are then performed to pattern the polymer layer 722, thus an opening 723 is formed to pass through the polymer layer 722 and expose a portion of the PPI line 718 for allowing subsequent bump process. The polymer layer 722, as the name suggests, is formed of a polymer, such as an epoxy, polyimide, benzocyclobutene (BCB), polybenzoxazole (PBO), and the like, although other relatively soft, often organic, dielectric materials can also be used. In one embodiment, the polymer layer 722 is a polyimide layer. In another embodiment, the polymer layer 722 is a polybenzoxazole (PBO) layer. The polymer layer 722 is soft, and hence has the function of reducing inherent stresses on respective substrate. In addition, the polymer layer 722 is easily formed to a thickness of tens of microns.

An under-bump-metallurgy (UBM) layer 724 that includes, in some embodiments, a diffusion barrier layer and a seed layer are formed. The UBM layer 724 is formed on the polymer layer 722 and the exposed portion of the PPI line 718, and lines the sidewalls and bottom of the opening 723. The diffusion barrier layer, also referred to as a glue layer, is formed to cover the sidewalls and the bottom of the opening 723. The diffusion barrier layer is, in some embodiments, formed of tantalum nitride, titanium nitride, tantalum, titanium, or the like. The formation methods include physical vapor deposition (PVD) or sputtering. The seed layer is, in some embodiments, a copper seed layer formed on the diffusion barrier layer. The seed layer is, in some embodiments, formed of copper alloys that include silver, chromium, nickel, tin, gold, and combinations thereof. In one embodiment, the UBM layer 724 includes a diffusion barrier layer formed of Ti and a seed layer formed of Cu.

A mask layer (not shown) is provided on the UBM layer 724 and patterned for exposing a portion of the UBM layer 724 for bump formation. A conductive material with solder wettability, such as SnAg, or other lead-free or lead-containing solder materials, is deposited on the exposed portion, thereby forming a bump (or ball) 306 in contact with the underlying UBM layer 724. The bump 306 defines a connection ball for the semiconductor device 700.

The dummy ball 306d (FIG. 7B) is formed, in some embodiments, in a similar manner to connection ball 306, except that dummy ball 306d is not formed in electrical connection with the IC(s) formed in or on the substrate 710. In some embodiments, the dummy ball 306d is formed on the polymer layer 722 with or without an intervening layer which has the same material as and is formed simultaneously with the UBM layer 724. In some embodiments, the dummy ball 306d has the same material as and is formed simultaneously with the connection ball 306.

The semiconductor device 700 with the connection ball(s) 306 and one or more dummy ball(s) 306d formed thereon is flipped and bonded to an underlying substrate (or another chip) by reflowing the balls 306 and 306d. The resulting structure is optionally encapsulated and solder balls are formed as disclosed herein with respect to FIG. 13.

In some embodiments, step 803 is performed to ensure that every corner ball of the modified ball pattern has two neighboring balls. For this purpose, as exemplarily illustrated in FIG. 6B, in addition to the dummy ball 306d1 added to the corner region 651, two dummy balls are added to the corner region 652 and one dummy ball (not numbered) is added to the corner region 653. The corner region 654 needs no modification as it is already free of isolated balls.

In some embodiments, step 803 is performed to ensure that every ball in at least one corner region of the modified ball pattern has two or more neighboring balls. For example and as disclosed above, dummy balls 306d2 and 306d3 are added to ensure that every ball in the corner region 651 has at least two neighboring balls.

In some embodiments, step 803 is performed to ensure that every ball in all corner regions, e.g., 651, 652, 653 and 654, of the modified ball pattern has two or more neighboring balls.

In some embodiments, step 803 is performed only for the corner regions, e.g., 651, 652, 653 and 654, to ensure that every ball in all corner regions of the modified ball pattern has two or more neighboring balls. For example, the modified ball pattern 600B in FIG. 6B includes no isolated balls in all corner regions, but still includes one or more isolated ball, e.g., 306g in FIG. 6B, outside the corner regions.

For the purpose of improving ball strength in one or more corner regions, a corner region is defined to be a region that contains a corner of the ball pattern and has dimensions which are about one third of a respective dimension of the ball pattern. For example, assume that the ball pattern (600B in FIG. 6) has a length B and a width B', a length A and a width A' of each corner region satisfy the following relationships: $A \leq \frac{1}{3} \ast B$ and $A' \leq \frac{1}{3} \ast B'$.

Figure 9A:
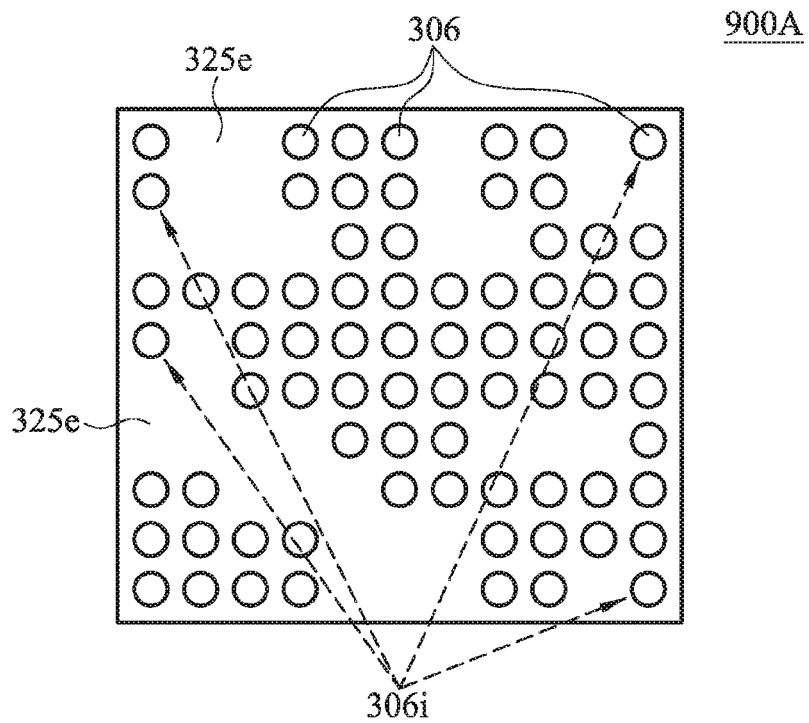
FIGS. 9A and 9B are schematic plan views of a ball pattern and a modified ball pattern in accordance with some embodiments, respectively.
Figure 9B:
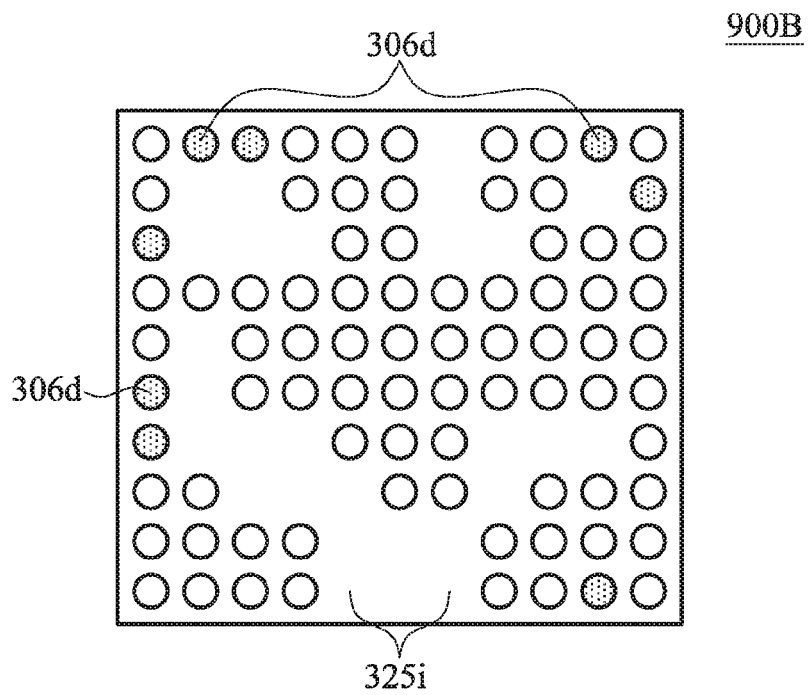
Figure 10:
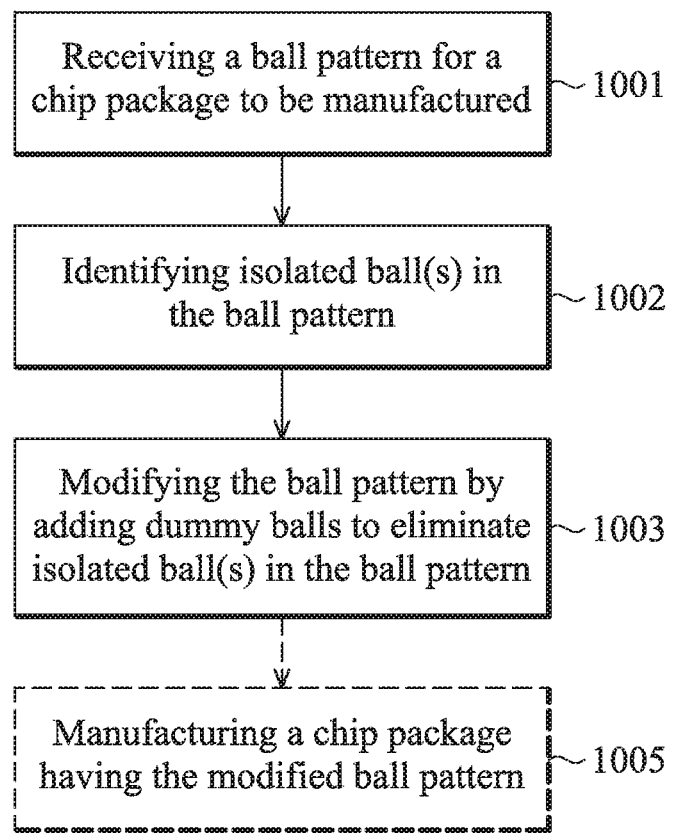
FIG. 10 is a flow chart of a method in accordance with some embodiments.

FIGS. 9A and 9B are schematic plan views of a ball pattern 900A and a modified ball pattern 900B in accordance with some embodiments, respectively. FIG. 10 is a flow chart of a method 1000 in accordance with some embodiments. The ball patterns of FIGS. 9A-9B will be used for illustration purposes with respect to the description of FIG. 10.

At step 1001, a ball pattern (such as the ball pattern 900A in FIG. 9A) of a plurality of connection balls 306 to be formed as electrical connections for a semiconductor device is received. The connection balls 306 are arranged at some, but not all, intersections of the columns and rows (not numbered) of the ball pattern 900A. Thus, some intersections remain empty as exemplarily illustrated at 325e in FIG. 9A.

At step 1002, the received ball pattern 900A is analyzed to identify any isolated ball. The analysis is performed in a manner similar to that described with respect to step 802.

At step 1003, the ball pattern 900A is modified by adding one or more dummy balls each to an empty intersection adjacent one of the identified isolated balls, so as to ensure that every ball in the modified ball pattern, including all connection and dummy balls, has two or more neighboring balls. The result is exemplarily illustrated in FIG. 9B. It should be noted that, in some embodiments, step 1003 is performed to improve ball strength throughout the ball pattern, rather than only in the corner regions. The modified ball pattern 900B may still include empty intersections, as exemplarily illustrated at 325e in FIG. 9B.

At step 1005, the semiconductor device is manufactured with the modified ball pattern 900B which as noted above may still include empty intersections. Any manufacturing process suitable for fabrication of semiconductor devices is applicable. An exemplary process has been described with respect to FIGS. 7A-7B.

Figure 11A:
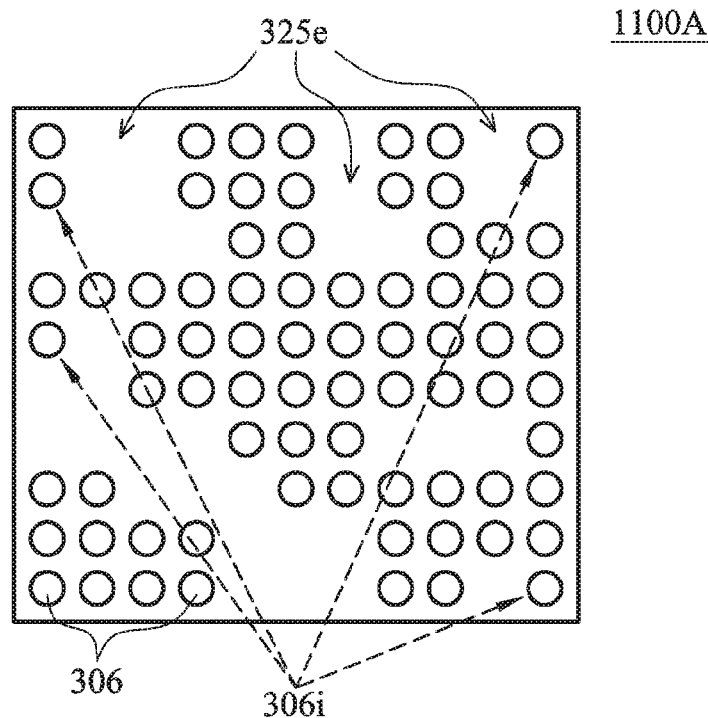
FIGS. 11A and 11B are schematic plan views of a ball pattern and a modified ball pattern in accordance with some embodiments, respectively.
Figure 11B:
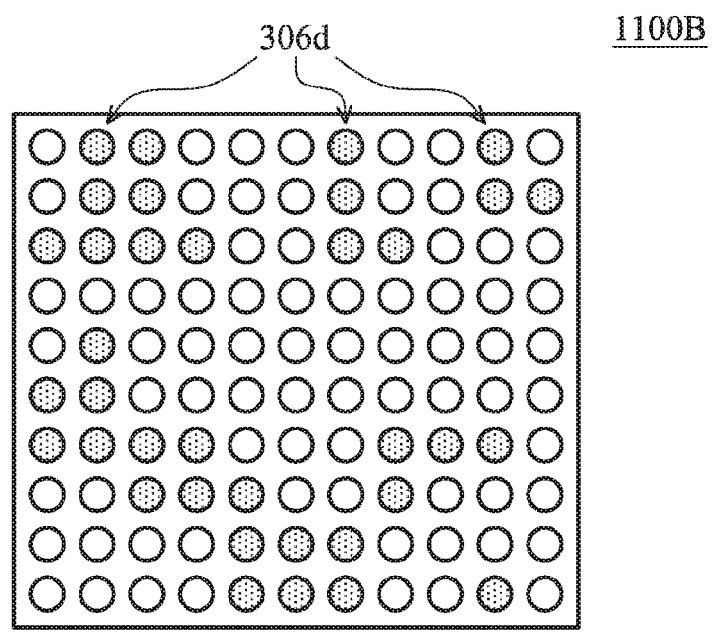
Figure 12:
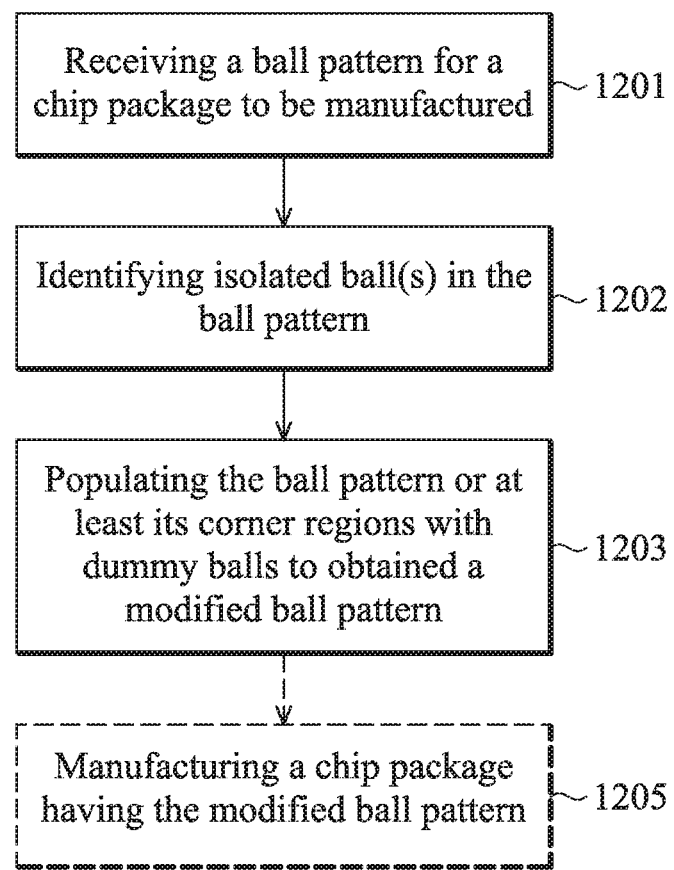
FIG. 12 is a flow chart of a method in accordance with some embodiments.

FIGS. 11A and 11B are schematic plan views of a ball pattern 1100A and a modified ball pattern 1100B in accordance with some embodiments, respectively. FIG. 12 is a flow chart of a method 1200 in accordance with some embodiments. The ball patterns of FIGS. 11A-11B will be used for illustration purposes in the description of FIG. 12.

At step 1201, a ball pattern (such as the ball pattern 1100A in FIG. 11A) of a plurality of connection balls 306 to be formed as electrical connections for a semiconductor device is received. The connection balls 306 are arranged at some, but not all, intersections of the columns and rows (not numbered) of the ball pattern 1100A. Thus, some intersections remain empty as exemplarily illustrated at 325e in FIG. 11A.

As step 1203, every empty intersections in the ball pattern 1100A is provided with a dummy ball 306d so as to provide a modified ball pattern 1100B with a uniform ball distribution. The modified ball pattern 1100B includes no empty intersections.

In some embodiments, a step 1202 for analyzing the received ball pattern 1100A to identify isolated balls is performed before step 1203, in a manner similar to that described with respect to step 802.

At step 1205, the semiconductor device is manufactured with the modified ball pattern 1100B which as noted above includes no empty intersections. Any manufacturing process suitable for fabrication of semiconductor devices is applicable. An exemplary process has been described with respect to FIGS. 7A-7B.

FIG. 13 is a schematic cross-section view of a chip scale package (CSP) 1300 in accordance with some embodiments. The CSP 1300 includes a chip or die 102 connected to a first side 116 of a substrate 104 by solder bumps 106 arranged on a surface 114, e.g., an active surface, of the chip 102. An encapsulant 108 is formed over the first side 116 of the substrate 104 to encapsulate the chip 102 therein. Solder balls 110 are formed on the second, opposite side 118 of the substrate 104 for electrical connection to other components (not shown).

In the CSP 1300, the ball pattern of the solder bumps 106 and/or the solder balls 110 has been modified in any of the manner described herein. Since the ball strength of the CSP 1300 has been improved, an underfill material is omitted in some embodiments, thereby lowering the manufacturing cost and time while ensuring acceptable ball strength. In further embodiments, the CSP 1300 is still provided with an underfill material between the chip 102 and the substrate 104, which further increases the improved ball strength against defects such as warpage, ball crack, die chipping, etc.

Although exemplary embodiments have been described mainly for CSPs, especially wafer-level CSPs, further embodiments are applicable for various ball grid array packages as well.

The above method embodiments show exemplary steps, but they are not necessarily required to be performed in the order shown. Steps is, in some embodiments, added, replaced, changed order, and/or eliminated as appropriate, in accordance with the spirit and scope of embodiments of the disclosure. Embodiments that combine different features and/or different embodiments are within scope of the disclosure and will be apparent to those skilled in the art after reviewing this disclosure.

According to some embodiments, a semiconductor device includes a contact region over a substrate. The semiconductor device further includes a metal pad over the contact region. Additionally, the semiconductor device includes a post passivation interconnect (PPI) line over the metal pad, where the PPI line is in contact with the metal pad. Furthermore, the semiconductor device includes an under-bump-metallurgy (UBM) layer over the PPI line. Moreover, the semiconductor device includes a plurality of solder balls over the UBM layer, the plurality of solder balls being arranged at some, but not all, intersections of a number of columns and rows of a ball pattern.

According to some embodiments, a semiconductor device includes a contact region over a substrate. Additionally, the semiconductor device includes a metal pad over the contact region, where the metal pad is in contact with the contact region. Furthermore, the semiconductor device includes a post passivation interconnect (PPI) line over the metal pad. The semiconductor device further includes a polymer layer over the PPI line. Additionally, the semiconductor device includes an under-bump-metallurgy (UBM) layer over the polymer layer. Moreover, the semiconductor device includes a plurality of solder balls over the UBM layer, the plurality of solder balls being arranged at some, but not all, intersections of a number of columns and rows of a ball pattern, wherein, at least in corner regions of the chip, each solder ball among the plurality of solder balls has at least two neighboring solder balls among the plurality of solder balls.

According to some embodiments, a semiconductor device with improved ball strength includes a chip having an active surface. Furthermore, the semiconductor device includes a plurality of connection balls on the active surface and in electrical connection with the chip, said connection balls being arranged at some, but not all, intersections of a number of columns and rows of a ball pattern. Additionally, the semiconductor device includes a plurality of dummy balls on the active surface but not in electrical connection with the chip, said dummy balls being arranged at intersections where the connection balls are not arranged, where, at least in corner regions of the chip, every connection ball of the plurality of connection balls or dummy ball of the plurality of dummy balls has at least two neighboring connection balls or dummy balls.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An integrated circuit semiconductor device, comprising:
a semiconductor substrate including one or more semiconductor devices; and
a bump pattern disposed over the semiconductor substrate, wherein the bump pattern comprises: a plurality of connection bumps which are electrically coupled to the one or more semiconductor devices of the semiconductor substrate, and a plurality of dummy bumps which are not in electrical connection with any semiconductor devices of the semiconductor substrate; and
wherein the plurality of dummy bumps are arranged asymmetrically with regards to a central region of the bump pattern.

2. The integrated circuit semiconductor device of claim 1, wherein the plurality of connection bumps are arranged asymmetrically with regards to the central region of the bump pattern.

3. The integrated circuit semiconductor device of claim 1, wherein within the bump pattern, the plurality of connection bumps and the plurality of dummy bumps are collectively arranged in a number of columns and rows, which are perpendicular to one another.

4. The integrated circuit semiconductor device of claim 3, wherein the bump pattern is free of any isolated bumps in at least a corner region of the bump pattern, wherein an isolated bump is a bump having at most one bump in adjacent intersections of the columns and rows.

5. The integrated circuit semiconductor device of claim 3, wherein an intersection of a column and a row in a corner region of the bump pattern is free of any bump.

6. The integrated circuit semiconductor device of claim 1, further comprising:
a contact region over the semiconductor substrate;
a metal pad over the contact region;
a post passivation interconnect (PPI) line over the metal pad, wherein the PPI line is in contact with the metal pad; and
an under-bump-metallurgy (UBM) layer over the PPI line; and
wherein the plurality of connection bumps and the plurality of dummy bumps are arranged over the UBM layer.

7. The integrated circuit semiconductor device of claim 6, wherein a connection bump of the bump pattern is electrically coupled to the one or more semiconductor devices through the PPI line, the metal pad, and the contact region; and wherein a dummy bump is isolated from the one or more semiconductor devices by a dielectric material over the PPI line.

8. The integrated circuit semiconductor device of claim 6, further comprising a seed layer between the PPI line and the UBM layer, wherein the seed layer comprises at least one of aluminum, copper alloy, silver, or gold.

9. The integrated circuit semiconductor device of claim 6, further comprising an adhesive layer between the PPI line and the UBM layer, wherein the adhesive layer comprises at least one of titanium, titanium nitride, tantalum, or tantalum nitride.

10. The integrated circuit semiconductor device of claim 6, further comprising a polymer layer over the PPI line, wherein the polymer layer includes an opening aligned over a portion of the PPI line.

11. The semiconductor device of claim 10, wherein the polymer layer comprises epoxy, polyimide, benzocyclobutene (BCB), polybenzoxazole (PBO), or polyimide.

12. An integrated circuit semiconductor device, comprising:
a semiconductor substrate including one or more semiconductor devices; and
a plurality of bumps arranged in a bump pattern made up of rows and columns over the semiconductor substrate, the plurality of bumps being arranged at some, but not all, intersections of the rows and columns, and wherein, at least in a corner region of the bump pattern, each bump has at least two directly neighboring bumps in neighboring rows and/or columns;
wherein the plurality of bumps of the bump pattern comprises:
a plurality of connection bumps which are electrically coupled to the one or more semiconductor devices of the semiconductor substrate; and
a plurality of dummy bumps which are not in electrical connection with any semiconductor devices of the semiconductor substrate;
wherein the plurality of dummy bumps are arranged asymmetrically with regards to a central region of the bump pattern.

13. The integrated circuit semiconductor device of claim 12, wherein the plurality of connection bumps are arranged asymmetrically with regards to a central region of the bump pattern.

14. The integrated circuit semiconductor device of claim 12, wherein an intersection of a column and row in the corner region of the bump pattern is free of any bump of the plurality of bumps.

15. The integrated circuit semiconductor device of claim 12, wherein at least one bump outside of the corner region has one or fewer neighboring bumps in neighboring rows and/or columns.

16. An integrated circuit semiconductor device, comprising:
a semiconductor substrate including one or more semiconductor devices;
a bump pattern which includes a plurality of bumps arranged in a number of columns and rows over an upper surface of the semiconductor substrate, wherein the plurality of bumps include a plurality of connection bumps and a plurality of dummy bumps, and wherein the plurality of bumps are arranged at some, but not all, intersections of the columns and rows; and
wherein, at least in a corner region of the bump pattern, each connection bump has at least two directly neighboring bumps in neighboring rows and/or columns;
wherein the plurality of dummy bumps are arranged asymmetrically with regards to a central region of the bump pattern.

17. The integrated circuit semiconductor device of claim 16, wherein at least one connection bump of the plurality of connection bumps outside of the corner region has one or fewer neighboring connection bumps.

18. The integrated circuit semiconductor device of claim 16, further comprising:

a substrate having opposite surfaces one of which is mechanically connected to the integrated circuit semiconductor device by the plurality of connection bumps and the plurality of dummy bumps, and electrically connected to the integrated circuit semiconductor device via the plurality of connection bumps;

an encapsulant on the one surface of the substrate and covering the integrated circuit semiconductor device and the plurality of connection bumps and the plurality of dummy bumps; and solder bumps on the other surface of the substrate and in electrical connection with the corresponding connection bumps of the plurality of connection bumps via the substrate.

19. The integrated circuit semiconductor device of claim 16, further comprising:

a contact region over the semiconductor substrate;

a metal pad over the contact region;

a post passivation interconnect (PPI) line over the metal pad, wherein the PPI line is in contact with the metal pad; and an under-bump-metallurgy (UBM) layer over the PPI line; and wherein the plurality of connection bumps and the plurality of dummy bumps are arranged over the UBM layer.

20. The integrated circuit semiconductor device of claim 19, wherein a connection bump of the bump pattern is electrically coupled to the one or more semiconductor devices through the PPI line, the metal pad, and the contact region; and wherein a dummy bump is isolated from the one or more semiconductor devices by a dielectric material over the PPI line.

* * * * *